United States Patent [19]

Braunbeck

[11] 3,970,800

[45] July 20, 1976

[54] SWITCHING ARRANGEMENT FOR ASCERTAINING OVERLAP PRIOR TO TRANSFER OF CODE DIGITS IN A TELEPHONE EXCHANGE

[75] Inventor: Werner Braunbeck, Munich, Germany

[73] Assignee: Siemens Aktiengesellschaft, Berlin & Munich, Germany

[22] Filed: Nov. 29, 1974

[21] Appl. No.: 528,556

[30] Foreign Application Priority Data

Nov. 30, 1973   Germany............................ 2359829

[52] U.S. Cl. ........................................... 179/18 AD
[51] Int. Cl.² ............................................ H04M 1/26
[58] Field of Search .............. 179/18 G, 38, 90 BD, 179/18 AB, 18 AD; 340/147 LP, 346

[56] References Cited
UNITED STATES PATENTS 3,626,106   12/1971   Greening et al. .............. 179/18 AD Primary Examiner—Thomas A. Robinson

[57] ABSTRACT

Apparatus for ascertaining an overlap prior to transfer of code digits being interpreted in a telephone exchange is described. A dial control device and a counting chain storing dialed code digits are provided for each subscriber and/or local repeater. A switching element allocated to each dial control device controls, upon expiration of a time determined by a clock pulse, the triggering of the transfer of a code digit from the counting chain as a result of a signal identifying the end of a digit, and transmits as a function of a clock pulse a test signal to a conductor leading to corresponding switching elements of other dial control devices. If one of the other dial control devices is simultaneously operative, the switching means associated therewith, being rendered operative by said test signal, causes blocking of retransmission of code digits to the digit interpretation device.

4 Claims, 3 Drawing Figures

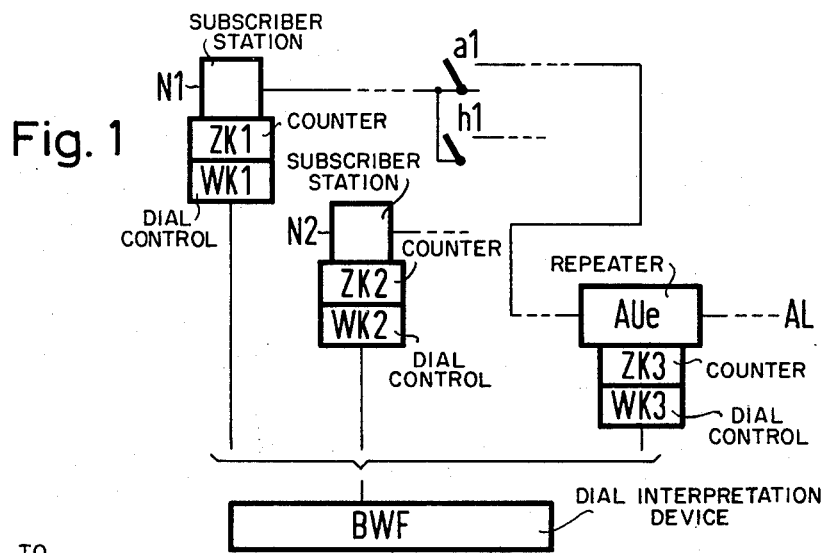
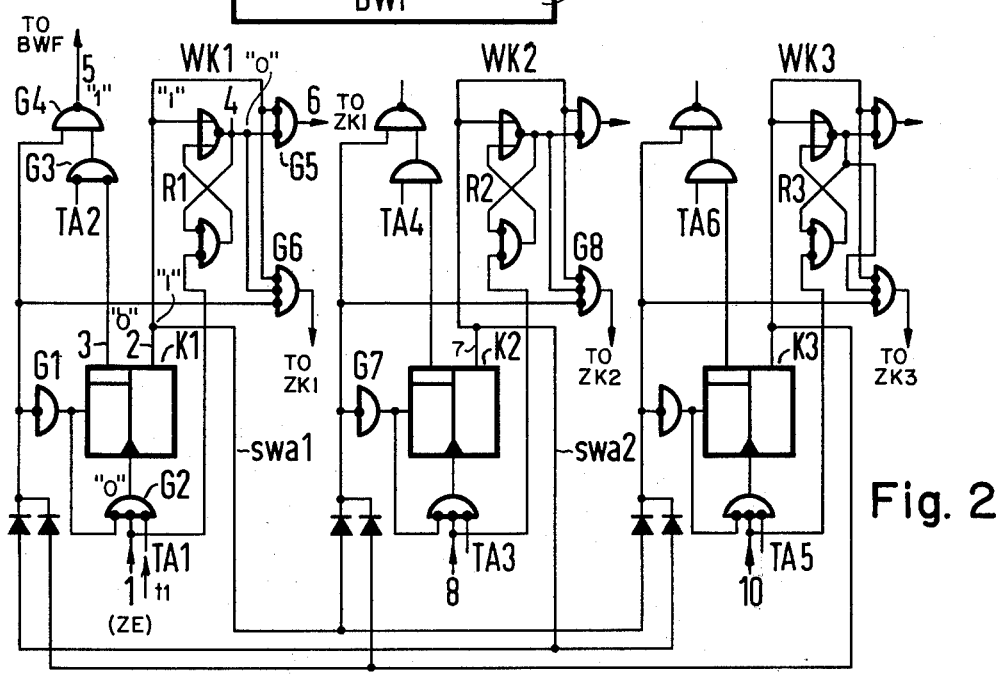
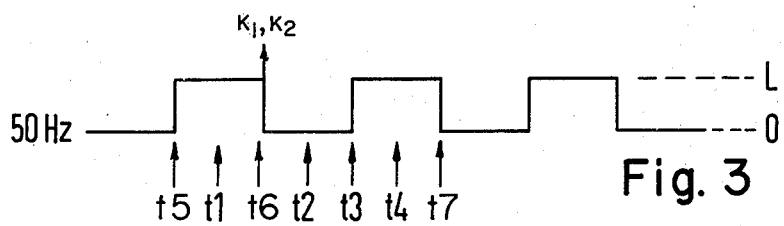

SWITCHING ARRANGEMENT FOR ASCERTAINING OVERLAP PRIOR TO TRANSFER OF CODE DIGITS IN A TELEPHONE EXCHANGE

BACKGROUND OF THE INVENTION

This invention relates to a switching arrangement for ascertaining an overlap or coincidence of digits prior to transfer of code digits being interpreted to the digit interpretation panel of a telephone exchange, more particularly a private branch exchange, wherein a dial control means ascertaining the overlap and a counting chain storing the dialed code digits are provided for each subscriber and/or local or external transfer.

Switching arrangements for private branch exchanges with common control facilities are known in the art, wherein after each dialed code digit there follows a digit interpretation. Only after a complete code has been ascertained, connecting paths are through-connected and other appropriate switching measures taken, such as blocking of the further call setup or, if an exchange code digit is dialed, access is gained to the outside (or exchange) trunk after the first code digit. In this type of system with common control facilities, the digit interpretation, likewise, occurs only simultaneously for a calling and a dialing subscriber station. This principle, commonly known as the "one-at-a-time" principle, can conveniently be employed in systems with common control facilities, since in systems with common control facilities having digit interpreters there are provided selector chains. The selector chains, if there are request signals, ensure that a particular connection to the digit interpreter or to the common control equipment can only take place consecutively. Such selector chains cannot be expanded without special provisions and, in addition, are too costly when their use becomes necessary for each line.

A system has been described in the prior art wherein when one gate is turned on, the other gates of the system are disabled. This gate system is a logic design for a selector apparatus, and it is not designed for preventing the simultaneous transfer of code digits from various selection monitors to a common digit interpretation device. This prior art circuit is described in SEL-NACHRICHTEN, Volume 13, 1965, Number 4, pages 186–197.

An object of the present invention resides in providing simple means for ascertaining the overlap of dialed code digits for each subscriber and/or local or external repeater transfer and in the event there is an overlap for blocking retransmission of code digits for interpretation if overlap occurs without limiting the expansion possibilities of the system.

SUMMARY OF THE INVENTION

In accordance with the invention, the foregoing and other objects are achieved in that a switching element allocated to each dial control device controls, upon the expiration of a time determined by a clock pulse, the initiation of the transfer of a code digit from the counting chain as a result of a signal identifying the end of a digit, and transmits as a function of the clock pulse during the operating state thereof a test signal to a conductor leading to the corresponding switching elements of the other dial control devices. If one of the switching elements of the other dial control means is concurrently in the operative position, the relevant switching elements in the operative position control, by virtue of a signal cause the blocking of the retransmission of code digits to the digit interpretation panel.

In this way the overlap can be ascertained by simple means during the switching process controlled as a function of the clock pulse, such that the overlap is determined separately for each subscriber and outside trunk. Thus, even without additional outlay for each subscriber and repeater, the busy signal can be routed, and the blocking of the code digit transfer from the individually allocated counting chain can be prevented. The use of individual switching elements means that the system can be expanded without prior investment and without additional outlay of circuitry. Moreover, the control of the above switching elements of the dial control device produces, as a function of the time, the result that the danger of overlap exists only during a clock pulse cycle. This is 20 microseconds in the case of a 50 Hertz clock pulse. Since, moreover, initially dial control devices are called upon independently of one another, it means that the unguarded interval for the switching arrangement according to the invention is very brief. The number of overlap determinations will thus remain small, so that relatively few blockings are necessary.

BRIEF DESCRIPTION OF THE DRAWINGS

The principles of the invention will be more readily understood by reference to the description of a preferred embodiment given hereinbelow in conjunction with the drawings, which are briefly described below.

FIG. 1 is a block-schematic diagram of a preferred embodiment of a PBX system employing the switching arrangement according to the invention.

FIG. 2 is a detailed schematic diagram of a preferred embodiment of a switching arrangement for preventing in the FIG. 1 embodiment the simultaneous seizure of the interpretation panel BWF in the FIG. 1 embodiment.

FIG. 3 is a time waveform diagram illustrating the operation of a portion of the FIG. 2 embodiment.

DETAILED DESCRIPTION OF THE DRAWINGS

FIG. 1 illustrates how individual counting chains ZK1 to ZK3 are allocated to the outside trunks in the described system. A dial control device, e.g. WK1, is allocated to each counting chain, e.g. ZK1, which ascertains the overlap of requests of two or more counting chains, after which the seizure of the interpretation panel shall be prevented.

In this invention, one proceeds on the assumption that a central control unit is not allocated to the system. This means that the system is not provided from the start with the normal functions according to the "one-at-a-time" principle.

Thus, if in such systems not provided with central control equipment, e.g. small PBX's, it is desired to operate according to the foregoing principle, the dial control in the example is effected for each subscriber and each outside trunk. However, if one wishes to utilize for the dial control device the advantages of a central interpretation panel in such a system, special provisions must be made so as to prevent the overlap.

It should nevertheless, be possible that each subscriber and each repeater have at all times access to the interpretation panel. For this reason during the dialing pauses another subscriber or another repeater is given access to the interpretation panel. Needless to say, in fairly large systems only repeaters, not subscribers, are connected to the interpretation panel.

The preferred embodiment described with reference to FIG. 1 is a circuit arrangement for a small PBX 1/1 to 1/9/2, into which can be integrated both the dial control device described with reference to FIG. 2 and the counting chain (not shown in detail), so that the circuitry provided for each subscriber and/or repeater and comprising a counting chain and a dial control device can be designed as an integrated chip.

The details of the circuit according to the invention for testing for overlap will now be described with reference to FIG. 2 which is a detailed diagrammatic view of a dial control device constructed according to the invention. In this switching arrangement it is assumed that after dialing each digit, a signal identifying the end of a digit is routed to the dial control device. Furthermore, a particular clock pulse is fed to the dial control device, e.g. a 50 Hertz clock pulse. Other, faster, clock pulses increase the possible seizure rate of the interpretation panel. Such dial control equipment is provided for each subscriber and each repeater. Dial control device WK1 is allocated to subscriber N1 (in FIG. 1), dial control device WK2 to subscriber N2, and dial control device WK3 to outside trunk AL, so that the signals identifying the end of a digit are fed simultaneously to the associated dial control device.

Assuming that, by way of example, a signal identifying the end of a digit is routed via line 1 to the dial control device WK1, then if a positive half wave of the 50 Hertz clock pulse appears simultaneously (t1, FIG. 3), gate 2 is saturated to produce a one signal, since gate G1 is still in its initial closed position. As a result, the master bistable stage in trigger circuit K1 is set to produce a one output at output terminal 2. When the 50 Hertz clock pulse is shifted to the negative half wave, the potential at the output of gate G2 is reset to zero. Thus, trigger circuit K1 is placed in the operative position, and bistable trigger circuit R1 is set via output 2, so that a "zero" is applied at output 4 of the trigger circuit.

Gate G3 still cannot be through-connected via output 3 of trigger circuit K1, because still no "zero" is offered from the 50 Hertz clock pulse. This does not occur until the next positive half wave (t3/t7, FIG. 3), so that gate G3 and, therewith, gate G4 are through-connected, and a release for the transfer of the code digit in the counting chain ZK1 to the interpretation panel BWF takes place via output 5 of gate G4. When the positive half wave comes to an end and becomes negative again (t5, FIG. 3), trigger circuit K1 is reset to "zero", thereby saturating gate G5 via output 2, so that, via output 6 of gate G5 a one signal is produced, actuation of the counting chain and, therewith, an allocation for the next digit can occur.

The latter operation occurs if it has been determined in the interpretation panel that the dialing is not fully completed. At the same time, the signal identifying the end of the digit is taken away from input 1 of gate G2. The foregoing goes to prove that trigger circuit K1 is operative for two half wavelengths, either negative or positive, i.e., during one cycle. At the most, the setting of the master bistable stage in trigger circuit K1 takes place a half wavelength, or less, before the trigger circuit is placed in the operative position. The same process takes place in the case of any other dial control upon arrival of a signal identifying the end of a digit and if there is a corresponding clock pulse.

If it is assumed that during the same positive half wavelength (between t5 and t6, FIG. 3) a signal identifying the end of a digit enters dial control device WK1, as well as dial control device WK2, then trigger circuit K1 and trigger circuit K2, placed in the operative position at the end of the first positive half cycle of the 50 Hertz clock pulse. As a result, an output signal from output 2 of trigger circuit K1 and from output 7 of trigger circuit K2 is produced. Thus, from output 2 via conductor swa1 a signal is sent to gate G7 of dial control device WK2 and, thereby, to trigger circuit K2, and through the signal via output 7 and conductor swa2, a signal is sent to gate G1 and, thus, to trigger circuit K1. This causes both trigger circuits to be reset independently of the 50-Hertz clock pulse, and this means that a "zero" potential becomes operative at all inputs of gate G6. The same is true of gate G8 of trigger circuit K2. The output signal from gates G6 and G8 causes the blocking of the transfer of code digits to the dial control device, i.e., the retransmission of the digits to the jumpering panel of the interpretation panel is prevented from the start. Furthermore, the counting chains are reset, and a busy signal is caused to be sent to the calling subscriber.

The foregoing goes to prove that this overlap applies to the entire operating time of two dial control devices, i.e., during one cycle of the clock pulse. Thus, no two dial control devices can be triggered simultaneously via the digit signal input. The clock pulse cycle determines the seizure rate of the interpretation panel. The faster the clock pulse, the more seizures are possible.

In this way, arbitrary seizure of the interpretation panel is possible by simple means through the dial control devices. The holding times are reduced to a minimum, so that the overlap rate, too, is minimized. The system can, therefore, be expanded as desired without additional outlay.

It can be seen from the diagram in FIG. 3 of the 50 Hertz waveform that, by way of example, at instant t1 a signal identifying the end of a digit is routed via line 1 to dial control device WK2. Both signals lead to the setting of the master bistable stage and both automatically cause trigger circuits K1 and K2 to be placed in the operative position. As described hereinabove, this leads to the blocking of the digit transfer. If in the case of the second dial control device WK2 the end of a digit enters after instant t3, at instant t4, then trigger circuit K2 is placed in the operative position, when trigger circuit K1 returns to its rest position. Then the first interpretation is terminated and the second interpretation can follow freely.

The principles of the invention are described hereinabove in terms of an exemplary structural example. It is contemplated that this example, as well as the signal values used, can be modified or changed in a variety of ways while remaining within the scope of the invention as defined by the appended claims.

I claim:

1. In a telephone exchange switching system having subscriber stations and/or local repeaters connected thereto, apparatus for ascertaining an overlap prior to transfer of code digits being interpreted to a dial interpretation device in said exchange, comprising:

a plurality of dial control means and counting means for receiving and storing dial code digits, each subscriber station and local repeater in said system having a said dial control means and counting means assigned thereto.

means for producing clock pulses, switching means in each said dial control means for controlling, upon expiration of a time period determined by a said clock pulse, the triggering of the transfer of a code digit from said counting means and as a result of a signal identifying the end of a digit, means in each said dial control means for generating and transmitting a test signal, upon operation of the said switching means associated therewith, responsive to said clock pulses, said test signal being coupled to switching means in others of said dial control means and means for blocking transfer of code digits to said dial interpretation device responsive to operating states in said switching means of said other dial control means as determined by said test signals.

2. The apparatus defined in claim 1 wherein said switching means includes means for triggering transfer of code digits from said counting means after a predetermined length of time.

3. The apparatus defined in claim 1 further comprising:

bistable switching means for preparing said counting means for storage of another code digit and for resetting of said dial control means following transfer of a code digit from said counting means.

4. The apparatus defined in claim 3 wherein said bistable switching means additionally controls blocking of retransmission of code digits to said dial interpretation device and transfer of a busy signal to the calling subscriber station.

* * * * *